United States Patent
Mossoba et al.

(10) Patent No.: US 12,182,494 B2
(45) Date of Patent: *Dec. 31, 2024

(54) SYSTEM AND METHOD FOR ESTABLISHING AN INTERACTIVE COMMUNICATION SESSION

(71) Applicant: Capital One Services, LLC, McLean, VA (US)

(72) Inventors: Michael Mossoba, Great Falls, VA (US); Abdelkader M'Hamed Benkreira, Brooklyn, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,973

(22) Filed: Aug. 12, 2021

(65) Prior Publication Data
US 2021/0374326 A1    Dec. 2, 2021

Related U.S. Application Data

(63) Continuation of application No. 16/791,216, filed on Feb. 14, 2020, now Pat. No. 11,093,691.

(51) Int. Cl.
*G06F 40/117* (2020.01)
*G06F 40/169* (2020.01)
(Continued)

(52) U.S. Cl.
CPC .......... *G06F 40/117* (2020.01); *G06F 40/169* (2020.01); *H04L 51/02* (2013.01); *H04L 51/046* (2013.01)

(58) Field of Classification Search
CPC .... G06F 40/117; G06F 40/169; G06F 40/151; H04L 51/02; H04L 51/046
(Continued)

(56) References Cited

U.S. PATENT DOCUMENTS

| | | | |
|---|---|---|---|
| 6,766,069 B1 * | 7/2004 | Dance | G06F 40/274 382/229 |
| 7,315,820 B1 | 1/2008 | Munns | |

(Continued)

FOREIGN PATENT DOCUMENTS

WO    2012047541 A1    4/2012

OTHER PUBLICATIONS

PCT International Application No. PCT/US21/17781. International Search Report and Written Opinion of the International Searching Authority, dated May 3, 2021, 9 pages.

(Continued)

*Primary Examiner* — Thuykhanh Le
(74) *Attorney, Agent, or Firm* — DLA Piper LLP US

(57) ABSTRACT

A system and method of establishing a communication session is disclosed herein. A computing system receives, from a client device, a content item comprising text-based content. The computing system generates a mark-up version of the content item by identifying one or more characters in the text-based content and a relative location of the one or more characters in the content item. The computing system receives, from the client device, an interrogatory related to the content item. The computing system analyzes the mark-up version of the content item to identify an answer to the interrogatory. The computing system generates a response message comprising the identified answer to the interrogatory. The computing system transmits the response message to the client device.

19 Claims, 9 Drawing Sheets

(51) Int. Cl.
*H04L 51/02* (2022.01)
*H04L 51/046* (2022.01)

(58) Field of Classification Search
USPC .................................................. 704/9
See application file for complete search history.

(56) References Cited

U.S. PATENT DOCUMENTS

| | | | |
|---|---|---|---|
| 8,386,248 B2 | 2/2013 | Dhanakshirur et al. | |
| 9,015,245 B1* | 4/2015 | Lee | H04L 65/60 709/219 |
| 9,165,406 B1 | 10/2015 | Gray et al. | |
| 10,699,145 B1* | 6/2020 | Bertrand | G06V 10/242 |
| 11,017,237 B1* | 5/2021 | Huang | G06N 5/022 |
| 11,145,123 B1* | 10/2021 | Chor | G06V 20/20 |
| 11,340,758 B1* | 5/2022 | Sood | H04W 4/21 |
| 11,343,468 B2* | 5/2022 | Kim | H04L 51/02 |
| 11,468,625 B2* | 10/2022 | Manzari | H04N 23/634 |
| 11,481,769 B2* | 10/2022 | Van Os | G06Q 20/3223 |
| 11,496,797 B2* | 11/2022 | Xu | H04N 21/4788 |
| 2004/0075677 A1 | 4/2004 | Loyall et al. | |
| 2004/0174434 A1* | 9/2004 | Walker | H04N 1/32128 348/211.6 |
| 2006/0026140 A1* | 2/2006 | King | G06F 40/169 707/E17.112 |
| 2006/0119900 A1* | 6/2006 | King | G06Q 30/02 707/E17.008 |
| 2009/0106016 A1 | 4/2009 | Athsani et al. | |
| 2009/0292538 A1 | 11/2009 | Barnish | |
| 2009/0315678 A1* | 12/2009 | Padmanabhan | H04Q 9/00 340/10.1 |
| 2010/0278453 A1 | 11/2010 | King | |
| 2010/0331041 A1* | 12/2010 | Liao | G06V 10/462 455/556.1 |
| 2011/0025842 A1 | 2/2011 | King et al. | |
| 2011/0145068 A1* | 6/2011 | King | G06F 16/435 348/222.1 |
| 2011/0153653 A1* | 6/2011 | King | G06F 16/5846 707/769 |
| 2012/0042288 A1* | 2/2012 | Liao | G06F 3/017 348/207.1 |
| 2012/0078891 A1 | 3/2012 | Brown et al. | |
| 2012/0130720 A1 | 5/2012 | Suda | |
| 2012/0320248 A1* | 12/2012 | Igarashi | H04N 21/4223 348/207.99 |
| 2013/0007055 A1 | 1/2013 | Brown et al. | |
| 2013/0016176 A1* | 1/2013 | Hines | H04N 7/14 348/E7.083 |
| 2013/0030994 A1 | 1/2013 | Calman et al. | |
| 2013/0311868 A1* | 11/2013 | Monney | G06F 40/117 715/230 |
| 2014/0337329 A1 | 11/2014 | Brown et al. | |
| 2014/0377733 A1* | 12/2014 | Olsen, Jr. | G09B 7/07 434/350 |
| 2015/0066511 A1* | 3/2015 | Baek | G06V 30/142 704/260 |
| 2015/0169525 A1* | 6/2015 | Palm | G06Q 50/01 715/230 |
| 2015/0170653 A1* | 6/2015 | Berndt | G10L 15/22 704/275 |
| 2015/0199338 A1 | 7/2015 | Freiberg et al. | |
| 2015/0356172 A1 | 12/2015 | Brown et al. | |
| 2016/0004692 A1 | 1/2016 | Rogowski et al. | |
| 2016/0005189 A1 | 1/2016 | Gray et al. | |
| 2016/0140858 A1* | 5/2016 | Adderly | G06F 40/30 704/9 |
| 2016/0224574 A1* | 8/2016 | Horvitz | G06F 16/332 |
| 2017/0052937 A1* | 2/2017 | Sirven | G06F 3/04845 |
| 2017/0053020 A1 | 2/2017 | Brown et al. | |
| 2017/0090693 A1 | 3/2017 | Ku et al. | |
| 2017/0091572 A1* | 3/2017 | Lindberg | G06V 20/62 |
| 2017/0177565 A1 | 6/2017 | Beason et al. | |
| 2017/0206797 A1 | 7/2017 | Solomon et al. | |
| 2017/0228018 A1* | 8/2017 | SchaeferJohann | G06F 3/013 |
| 2017/0249384 A1* | 8/2017 | Kandylas | G06F 16/358 |
| 2017/0286383 A1* | 10/2017 | Koul | G06V 10/44 |
| 2017/0324785 A1* | 11/2017 | Taine | H04L 51/043 |
| 2017/0329872 A1* | 11/2017 | Dispensa | G06F 16/248 |
| 2017/0330084 A1 | 11/2017 | Cook et al. | |
| 2018/0034879 A1* | 2/2018 | Chegini | H04L 65/403 |
| 2018/0090136 A1 | 3/2018 | Connell, II et al. | |
| 2018/0139204 A1* | 5/2018 | Votaw | G06T 11/60 |
| 2018/0165984 A1* | 6/2018 | Waldron | G06V 20/20 |
| 2018/0266531 A1* | 9/2018 | Brown | F16H 3/091 |
| 2018/0276896 A1* | 9/2018 | Launonen | G06T 19/006 |
| 2018/0284975 A1* | 10/2018 | Carrier | G06F 16/9535 |
| 2018/0322600 A1* | 11/2018 | Le Chevalier | G06Q 10/00 |
| 2019/0043302 A1* | 2/2019 | Lyons | G06T 15/08 |
| 2019/0065615 A1* | 2/2019 | Room | G06F 16/954 |
| 2019/0108578 A1* | 4/2019 | Spivack | G09B 5/065 |
| 2019/0156162 A1* | 5/2019 | King | G06F 40/00 |
| 2019/0214005 A1* | 7/2019 | Abdallah | H04L 67/535 |
| 2019/0326022 A1* | 10/2019 | El-Kalliny | G16H 80/00 |
| 2019/0349320 A1* | 11/2019 | Karuppusamy | H04L 51/02 |
| 2019/0378024 A1* | 12/2019 | Singh | G06N 5/043 |
| 2019/0392066 A1 | 12/2019 | Kim et al. | |
| 2020/0088463 A1* | 3/2020 | Jeong | G06F 3/167 |
| 2020/0110578 A1* | 4/2020 | Miller | G06F 3/0482 |
| 2020/0110931 A1* | 4/2020 | Saluja | G06F 16/9566 |
| 2020/0125848 A1* | 4/2020 | Nandi | G06F 3/011 |
| 2020/0151244 A1* | 5/2020 | Rastogi | G06F 40/194 |
| 2020/0151390 A1* | 5/2020 | Li | G06F 40/295 |
| 2020/0234045 A1* | 7/2020 | Palomo | G06F 16/532 |
| 2020/0236278 A1* | 7/2020 | Yeung | H04N 21/2187 |
| 2020/0242964 A1* | 7/2020 | Wu | G09B 7/02 |
| 2020/0258013 A1* | 8/2020 | Monnett | H04L 41/5074 |
| 2020/0265377 A1 | 8/2020 | Al Dhaheri et al. | |
| 2020/0311059 A1 | 10/2020 | Kamata | |
| 2020/0320365 A1* | 10/2020 | Arat | G06F 8/35 |
| 2020/0342548 A1* | 10/2020 | Mazed | G06Q 20/36 |
| 2020/0342652 A1* | 10/2020 | Rowell | G06V 10/82 |
| 2020/0371663 A1* | 11/2020 | Rubinstein | G06F 3/0482 |
| 2020/0379122 A1* | 12/2020 | Tontiruttananon | G01S 19/215 |
| 2020/0387276 A1* | 12/2020 | Scholler | G06F 3/042 |
| 2020/0401212 A1* | 12/2020 | Devries | G02B 27/0101 |
| 2021/0011899 A1* | 1/2021 | Olivier | G06F 40/134 |
| 2021/0026906 A1 | 1/2021 | Reznik | |
| 2021/0042724 A1* | 2/2021 | Rathod | G07G 1/0054 |
| 2021/0056251 A1* | 2/2021 | Parmar | G06F 3/04847 |
| 2021/0073293 A1* | 3/2021 | Fenton | H04L 51/08 |
| 2021/0076105 A1* | 3/2021 | Parmar | H04N 21/234336 |
| 2021/0092081 A1* | 3/2021 | Mullins | G06T 19/006 |
| 2021/0118442 A1* | 4/2021 | Poddar | G06V 40/25 |
| 2021/0120206 A1* | 4/2021 | Liu | G06V 10/255 |
| 2021/0142356 A1* | 5/2021 | Samanta | G06F 40/169 |
| 2021/0142706 A1* | 5/2021 | Mehandjiysky | G09G 3/035 |
| 2021/0152508 A1* | 5/2021 | Willis | H04L 51/18 |
| 2021/0157475 A1* | 5/2021 | Hansbrough | G06F 40/279 |
| 2021/0192302 A1* | 6/2021 | Wang | G06K 19/06037 |
| 2021/0247882 A1* | 8/2021 | Norman | G06F 3/0484 |
| 2021/0374326 A1* | 12/2021 | Mossoba | G06F 40/117 |
| 2022/0092131 A1* | 3/2022 | Koukoumidis | G06Q 10/00 |
| 2022/0148248 A1* | 5/2022 | McIntyre-Kirwin | G06V 20/20 |
| 2022/0159319 A1* | 5/2022 | Wang | H04N 21/2187 |
| 2022/0282910 A1* | 9/2022 | Jeong | F25D 23/028 |
| 2022/0383367 A1* | 12/2022 | Chandler | G06Q 30/0641 |
| 2023/0153347 A1* | 5/2023 | Shunock | G06Q 30/02 705/14.54 |

OTHER PUBLICATIONS

Office Action for Canadian Patent Application No. 3166001, mailed Aug. 22, 2023, 3 Pages.

Extended European Search Report issued in EP Application No. 21753408.0, 8 pages, dated Feb. 9, 2024.

\* cited by examiner

SYSTEM AND METHOD FOR ESTABLISHING AN INTERACTIVE COMMUNICATION SESSION

CROSS-REFERENCE TO RELATED APPLICATION INFORMATION

This is a continuation of U.S. patent application Ser. No. 16/791,216, filed Feb. 14, 2020, which is incorporated herein by reference in its entirety.

FIELD OF THE DISCLOSURE

The present disclosure generally relates to a system and method for establishing an interactive communication session.

BACKGROUND

Currently, the process of managing various documents for an individual may be a time consuming and difficult process. For example, as an individual applies for credit cards, open savings accounts, rent apartments, take out car loans, and the like, the individual must manage each respective agreement and maintain a working knowledge of what each agreement requires of the individual. In some cases, due to the way each document is written, such information may be difficult to find or understand.

SUMMARY

In some embodiments, a method of establishing a communication session is disclosed herein. A computing system receives, from a client device, a content item comprising text-based content. The computing system generates a mark-up version of the content item by identifying one or more characters in the text-based content and a relative location of the one or more characters in the content item. The computing system receives, from the client device, an interrogatory related to the content item. The computing system analyzes the mark-up version of the content item to identify an answer to the interrogatory. The computing system generates a response message comprising the identified answer to the interrogatory. The computing system transmits the response message to the client device.

In some embodiments, receiving, at the computing system from the client device, the content item comprising text-based content includes the computing system receiving an image of the content item via a camera associated with the client device.

In some embodiments, transmitting, by the computing system, the response message to the client device includes the computing system augmenting the content item illustrated on a display associated with the client device. The content item remains within a line-of-vision of the camera.

In some embodiments, augmenting the content item illustrated on a display associated with the client device includes the computing system identifying a location of the identified answer within a portion of the content item within the line-of-vision of the camera and highlighting the identified answer on the display.

In some embodiments, generating, by the computing system, the mark-up version of the content item by identifying both the one or more characters in the text-based content and the relative location of the one or more characters in the content item includes the computing system injecting one or more metatags into the content item to form the mark-up version.

In some embodiments, analyzing, by the computing system, the mark-up version of the content item to identify the answer to the interrogatory includes the computing system identifying one or more possible answers to the interrogatory, generating a confidence score for each possible answer of the one or more possible answers, identifying a possible answer that is associated with a highest confidence score, and setting the possible answer associated with the highest confidence score as the answer to the interrogatory.

In some embodiments, analyzing, by the computing system, the mark-up version of the content item to identify the answer to the interrogatory includes the computing system identifying one or more possible answers to the interrogatory, generating a confidence score for each possible answer of the one or more possible answers, determining that the confidence score for each possible answer is below a threshold confidence score, generating a clarification question seeking clarification of the identified interrogatory based on the determining, and transmitting the clarification question to the client device.

In some embodiments, the computing system further receives, from the client device, a clarification answer from the client device. The computing system parses the clarification answer to identify a revised interrogatory contained therein. The computing system analyzes the mark-up version of the content item to identify a revised answer to the revised interrogatory. The computing system generates a confidence score for the revised answer. The computing system determines determining that the confidence score for the revised answer is at least greater than the threshold confidence score. The computing system sets the revised answer as the answer to the interrogatory.

In another embodiment, a non-transitory computer readable medium is disclosed herein. The non-transitory computer readable medium includes one or more sequences of instructions which, when executed by one or more processors, cause to one or more processors to perform operations. The operations include receiving, from a client device, a content item comprising text-based content. The operations further include generating a mark-up version of the content item by identifying one or more characters in the text-based content and a relative location of the one or more characters in the content item. The operations further include receiving, from the client device, a natural-language message related to the content item. The operations further include identifying an interrogatory in the natural-language message. The operations further include analyzing the mark-up version of the content item to identify an answer to the interrogatory. The operations further include notifying the client device of the identified answer.

In some embodiments, receiving, from the client device, the content item comprising text-based content, comprises includes receiving an image of the content item via a camera associated with the client device.

In some embodiments, notifying the client device of the identified answer includes augmenting the content item illustrated on a display associated with the client device. The content item remains within a line-of-vision of the camera.

In some embodiments, augmenting the content item illustrated on a display associated with the client device includes identifying a location of the identified answer within a portion of the content item within the line-of-vision of the camera and highlighting the identified answer on the display.

In some embodiments, generating the mark-up version of the content item by identifying both the one or more characters in the text-based content and the relative location of the one or more characters in the content item includes injecting one or more metatags into the content item to form the mark-up version.

In some embodiments, analyzing the mark-up version of the content item to identify the answer to the interrogatory includes identifying one or more possible answers to the interrogatory, generating a confidence score for each possible answer of the one or more possible answers, identifying a possible answer that is associated with a highest confidence score, and setting the possible answer associated with the highest confidence score as the answer to the interrogatory.

In some embodiments, analyzing the mark-up version of the content item to identify the answer to the interrogatory includes identifying one or more possible answers to the interrogatory, generating a confidence score for each possible answer of the one or more possible answers, determining the confidence score for each possible answer is below a threshold confidence score, generating a clarification question seeking clarification of the identified interrogatory based on the determining, and transmitting the clarification question to the client device.

In some embodiments, notifying the client device of the identified answer includes interfacing with the client device via a chat bot to establish a communication channel between the client device and the non-transitory computer readable medium.

In another embodiments, a system is disclosed herein. The system includes a processor and a memory. The memory has programming instructions stored thereon, which, when executed by the processor, performs one or more operations. The one or more operations include receiving, from a client device, a content item comprising text-based content. The one or more operations further include generating a mark-up version of the content item by identifying one or more characters in the text-based content and a relative location of the one or more characters in the content item. The one or more operations further include receiving, from the client device, an interrogatory related to the content item. The one or more operations further include analyzing the mark-up version of the content item to identify an answer to the interrogatory. The one or more operations further include notifying the client device of the identified answer.

In some embodiments, receiving the content item comprising text-based content includes receiving an image of the content item via a camera associated with the client device.

In some embodiments, notifying the client device of the identified answer includes augmenting the content item illustrated on a display associated with the client device. The content item remains within a line-of-vision of the camera.

In some embodiments, augmenting the content item illustrated on a display associated with the client device includes identifying a location of the identified answer within a portion of the content item within the line-of-vision of the camera and highlighting the identified answer on the display.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of establishing a communication session between two computing devices. For example, the one or more techniques disclosed herein are directed to a system and method of converting a content item to a dynamic content item, by creating a markup version of the content item such that the system can respond to one or more interrogatories posed by a user. In some embodiments, a user may upload a content item to the system via an application executing thereon. In some embodiments, the user may upload the content item to the system by capturing an image of the content item, and transmitting the content item to the system via an application or an electronic based message (e.g., text message, email, etc.). Once the content item is converted to a markup version, the system may establish a communication session between the user and the system related to the content of the content item. For example, a user may submit a natural language question (i.e., interrogatory) to the system, which may process and understand the question, and subsequently reply to the user's question with an answer. The system may scan the markup version of the content item to identify one or more possible answers to the users question. Based on a confidence score assigned to each possible answer, the system may identify the most likely answer to the user's question, and reply accordingly.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
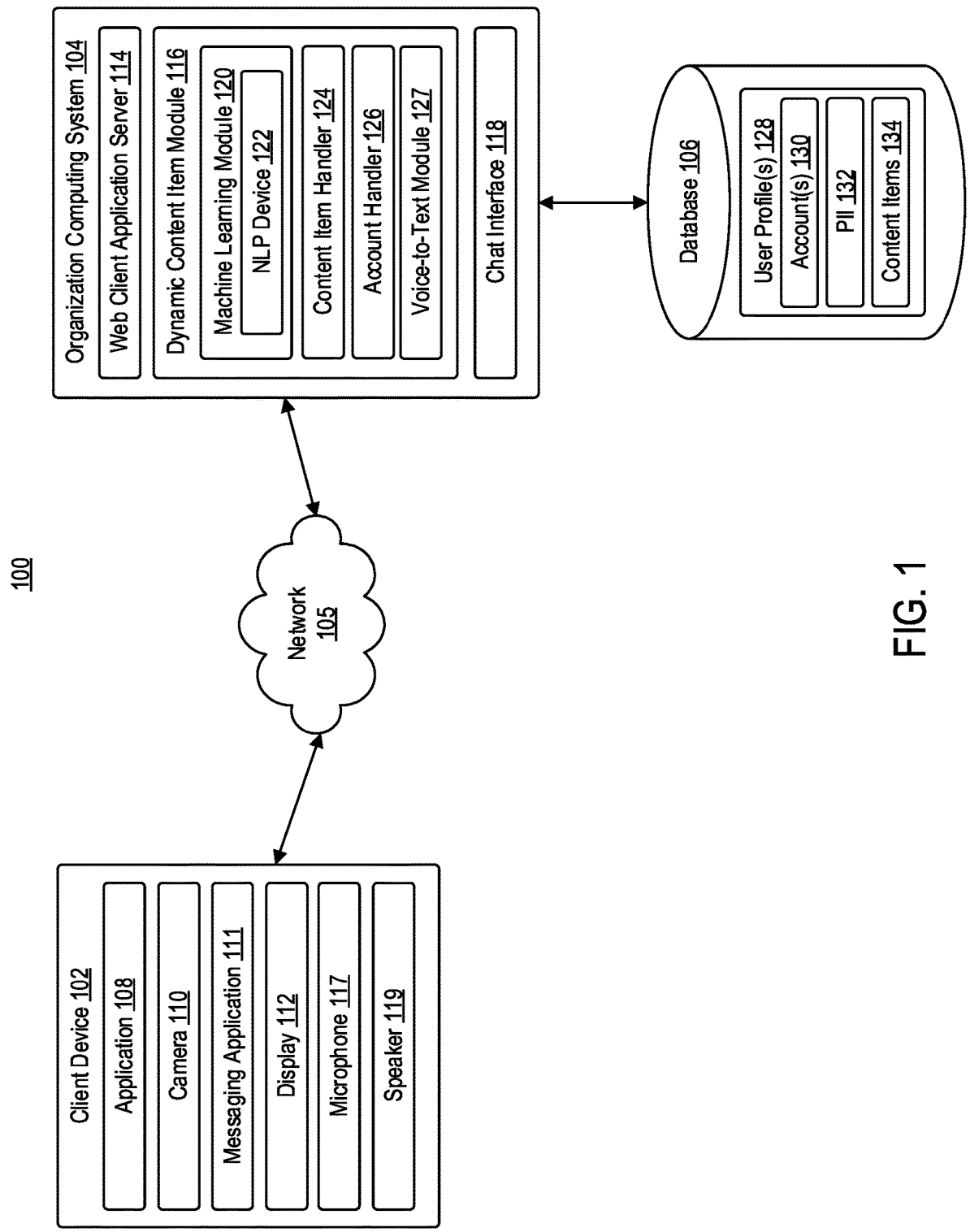
FIG. 1 is a block diagram illustrating a computing environment, according to example embodiments.

FIG. 1 is a block diagram illustrating a computing environment 100, according to one embodiment. Computing environment 100 may include at least a client device 102, an organization computing system 104, and a database 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of system 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 108, camera 110, messaging application 111, and display 112. Application 108 may be representative of a web browser that allows access to a website or a stand-alone application. Client device 102 may access application 108 to access functionality of organization computing system 104. Client device 102 may communicate over network 105 to request a webpage, for example, from web client application server 114 of organization computing system 104. For example, client device 102 may be configured to execute application 108 to access content managed by web client application server 114. The content that is displayed to client device 102 may be transmitted from web client application server 114 to client device 102, and subsequently processed by application 108 for display through a graphical user interface (GUI) of client device 102.

In some embodiments, camera 110 may be integrated with client device 102. For example, camera 110 may be built into client device 102 (e.g., front-facing and/or rear-facing camera of a mobile device). In some embodiments, camera 110 may be separate from client device 102. For example, camera 110 may be a digital camera that can upload images to client device 102. Generally, camera 110 may be an input device configured to capture one or more images for upload to organization computing system 104. For example, camera 110 may be configured to capture one or more images of a document for upload to client device 102.

Messaging application 111 may be representative of a web browser that allows access to a website or a stand-alone application. In some embodiments, client device 102 may be configured to execute messaging application 111 to access an email account managed by a third party web server. In some embodiments, client device 102 may be configured to execute messaging application 111 to transmit one or more text messages (e.g., SMS messages, iMessages, etc.) to one or more remote computing devices.

In some embodiments, display 112 may be integrated with client device 102. For example, display 112 may be a screen of a mobile device or tablet. In some embodiments, display 112 may be separate from client device 102. For example, display 112 may be a monitor coupled to client device 102. Generally, display 112 may be an output device associated with client device 102. Display 112 may be configured to display one or more graphical user interfaces (GUIs) that are received and/or rendered by client device 102. In some embodiments, client device 102 may further include a microphone 117 and speaker 119 associated therewith.

Organization computing system 104 may include at least web client application server 114, dynamic content item module 116, and chat interface 118. Each of dynamic content item module 116 and chat interface 118 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Dynamic content item module 116 may be configured to convert a content item uploaded by client device 102 to a mark-up version of the content item. In some embodiments, a content item may be representative of text on a piece of paper or text in a digital format. By converting the content item uploaded by the client device 102 to a mark-up version, dynamic content item module 116 may facilitate interrogatories directed to the content of the convent item. In other words, dynamic content item module 116 may convert a content item to a mark-up version such that a user may establish a communication session with organization computing system 104 directed to the content of the content item. For example, a user, via application 108 or messaging application 111, may transmit a question to organization computing system 104 directed to the content of content items managed by organization computing system 104.

Dynamic content item module 116 may include machine learning module 120, natural language processor 122, content item handler 124, account handler 126, and voice-to-text module 127.

Machine learning module 120 may include one or more instructions to train a prediction model used by dynamic content item module 116. To train the prediction model, machine learning module 120 may receive, as input, one or more content items. Machine learning module 116 may implement one or more machine learning algorithms to train the prediction model to classify content items. For example, machine learning module 116 may train a prediction model to identify one or more features of a content item, such that dynamic content item module 116 can classify the content item and/or identify relevant, or key, sections of the content item. In some embodiments, the prediction model can identify relative size and location of text in the content item. For example, prediction model may determine that an item is a header because it has 1.5× bigger than the surrounding text. In a specific example, machine learning module 116 may train the prediction model to identify a standard apartment lease and the one or more relevant sections thereof (e.g., tenant responsibilities, rental due dates, security deposit information, pet information, etc.). Machine learning module 116 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model. By identifying the type of content item and the one or more relevant sections thereof, machine learning module 120 may be configured to embed or inject one or more metatags into content item. The one or more metatags aid in subsequent analysis of the content item, upon receiving a prompt from client device 102.

In some embodiments, machine learning module 120 may include NLP device 122. Although NLP device 122 is shown contained in machine learning module 120, those skilled in the art may recognize that NLP device 122 may be independent from machine learning module 120. NLP device 122 may be configured to receive and process one or more content items from client device 102. For example, NLP device 122 may be configured to receive the content item from machine learning module 120. NLP device 122 may scan the content item to learn and understand the content contained therein. NLP device 122 may be trained to identify one or more parts of speech, such that NLP device 122 can tag one or more portions of content items with one or more identifiers. In other words, NLP device 122 may inject the text with one or more metatags, identifying one or more portions thereof. The combination of the metatags generated by machine learning model 120 and the metatags generated by NLP device 122 may result in a markup version of the content item. Metatags may be representative of code snippets that may be injected into portions of the one or more content items. Natural language processor (NLP) device 122 may further be configured to receive and process incoming dialogue messages from client device 102. For example, NLP device 102 may be configured to receive an interrogatory from client device 102 directed to a content item, determine the meaning of the interrogatory, and provide a user of client device 102 with an answer. NLP device 102 may be configured to receive and execute a command that includes an incoming interrogatory, where the command instructs NLP device 122 to determine the meaning of the interrogatory. NLP device 122 may be configured to continuously monitor or intermittently listen for and receive commands to determine if there are any new commands or requests directed to NLP device 122. Upon receiving and processing an incoming dialogue message, NLP device 122 may output the meaning of an interrogatory contained therein, for example, in a format that other components of dynamic content item module 116 can process. In some embodiments, the received dialogue message may be the result of client device 102 transmitting a text message to organization computing system 104. In some embodiments, the received dialogue message may be the result of client device 102 transmitting an electronic message to organization computing device 102.

Content item handler 124 may be configured to manage one or more content items. For example, upon receiving a notification that NLP device 122 output a meaning of an interrogatory, content item handler 124 may scan the marked-up version of the content item to match the perceived meaning of the interrogatory to one or more possible answers. For example, content item handler 124 may identify one or more metatags relevant to the interrogatory and extract an answer to the interrogatory from the relevant section. In some embodiments, NLP device 122 may prompt the user to re-scan areas of a content item that may not have been properly scanned (e.g., occlusion, darkness, lack of image stabilizations, etc.) or prompt the user to scan more of the content item (e.g., scan the second page) if more context is required.

Voice-to-text module 127 may be configured to translate received voice data to text. For example, voice-to-text module 127 may implement speech recognition software configured to recognize spoken language and transform the spoken language into a text format.

Account handler 126 may be configured to manage an account associated with each user. For example, account handler 116 may be configured to communicate with database 106. As illustrated, database 106 may include one or more user profiles 128. Each user profile 128 may correspond to a user with an account with organization computing system 104. Each user profile 128 may include one or more accounts 130, personal identification information 132, and one or more content items 134.

Each of one or more accounts 128 may correspond to an account with organization computing system 104. Such accounts may include, but are not limited to, checking accounts, savings accounts, credit card accounts, and the like. Personal identification information 132 may correspond to one or more items of information associated with the user. Such personal identification information 132 may include, but is not limited to, user name, password, date of birth, social security number, address, full legal name, telephone number, billing zip code, salary information, and the like. Content items 134 may correspond to one or more content items uploaded or transmitted from client device 102 to organization computing system 104. Content items 134 may include marked-up version of each content item as well as the original content item transmitted to organization computing system 104.

Chat interface 118 may be configured to receive one or more messages from client device 102. For example, chat interface 118 may be configured to establish a persistent chat session between client device 102 and organization computing system 104. Additionally, chat interface 118 may engage in dialogue with a user of client device 102, such that chat interface 118 may respond to any follow-up questions the user may have.

Figure 2:
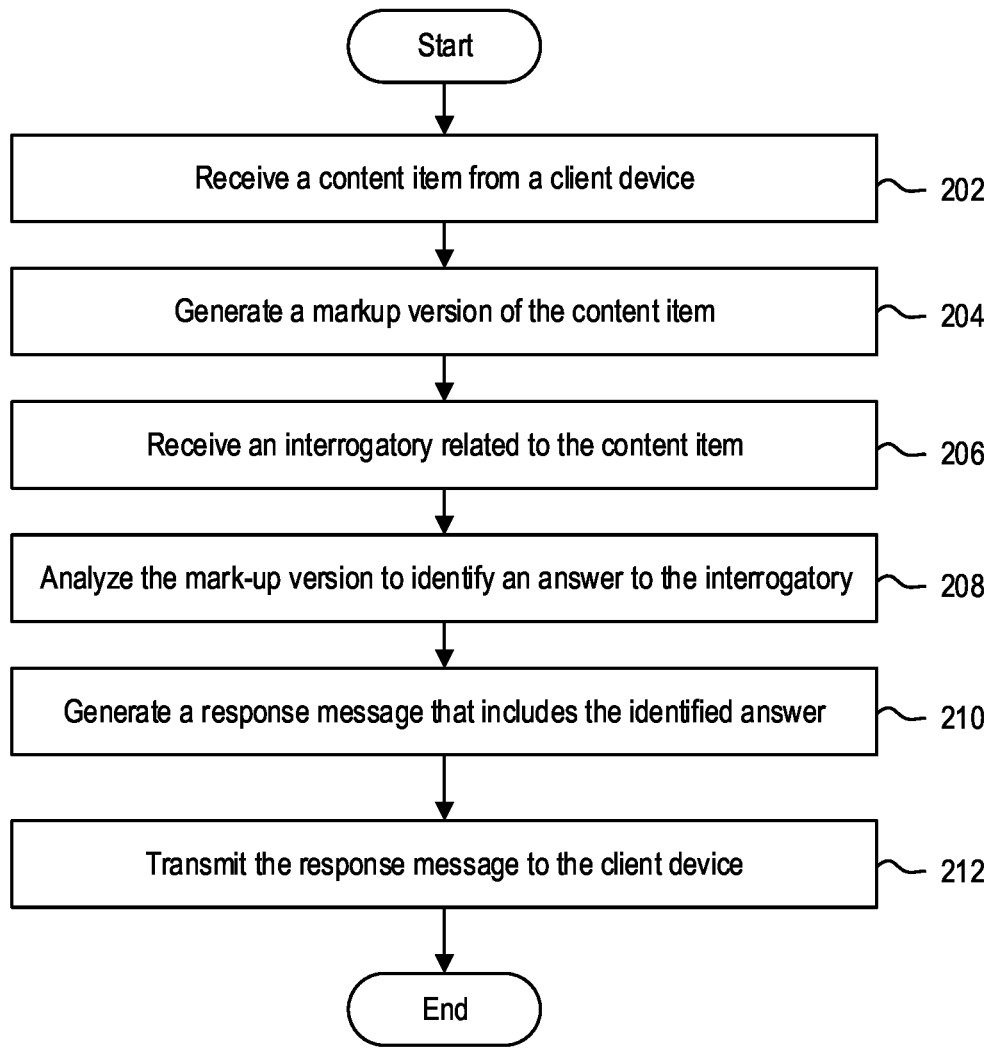
FIG. 2 is a flow diagram illustrating a method of establishing a communication session, according to example embodiments.

FIG. 2 is a flow diagram illustrating a method 200 of establishing a communication session, according to example embodiments. Method 200 may begin at step 202.

At step 202, organization computing system 104 may receive a content item from client device 102. In some embodiments, organization computing system 104 may receive content item via application 108. For example, client device 102 may navigate to an upload portal associated with organization computing system 104. Client device 102 may upload the content item via the upload portal. In some embodiments, organization computing system 104 may receive content item via a text message or electronic message. For example, client device 102 may transmit an image of the content item or the content item, itself, via messaging application 111.

At step 204, organization computing system 104 may generate a markup version of the content item. In some embodiments, machine learning module 120 and NLP device 122 may work in conjunction to generate a markup version of the content item using a trained prediction model and natural language processing capabilities. For example, machine learning module 120 may implement prediction model to classify a type of content item associated with the content item, as well as one or more relevant sections of the content item (e.g., content item headers). In some embodiments, machine learning module 120 may perform an optical character recognition (OCR) process on the content item. Based on information identified in the prediction model (e.g., type of content item, sections of the content item, etc.), machine learning model 120 may inject one or more metatags into the content item. Each of the one or more metatags may identify relevant sections in the content item for future identification.

NLP device 122 may receive and process the content items received from machine learning module 120. NLP device 122 may scan the content item to learn and understand the content contained therein. NLP device 122 may scan the text received in the content item and inject the text with one or more metatags, identifying one or more portions thereof. The combination of the metatags generated by machine learning model 120 and the metatags generated by NLP device 122 may result in a markup version of the content item.

At step 206, organization computing system 104 may receive an interrogatory related to the content item. In some embodiments, organization computing system 104 may receive the interrogatory via chat interface 118. For example, chat interface 118 may receive an incoming dialogue message that includes one or more interrogatories from client device 102 via application 108. In another example, chat interface 118 may receive an incoming dialogue message that includes one or more interrogatories from client device 102 via messaging application 111.

At step 208, organization computing system 104 may analyze the markup version of the content item to identify an answer to the interrogatory. NLP device 122 may receive and process the incoming dialogue message from client device 102. For example, NLP device 102 may receive the interrogatory from client device 102 and determine the meaning of the interrogatory. NLP device 122 may notify content item handler 124 of the meaning of the interrogatory. NLP device 122 may output the meaning of the interrogatory contained therein in a format that content item handler 124 can process. Content item handler 124 may scan the markup version of the content item to identify an answer to the interrogatory based on the output generated by NLP device 122. For example, content item handler 124 may identify one or more metatags relevant to the interrogatory and extract an answer to the interrogatory from the relevant section. In some embodiments, such process may be performed to recognize text embedded in images (e.g., promotional materials that have text on top of images).

At step 210, organization computing system 104 may generate a response message that includes the identified answer. For example, chat interface 118 may be configured to generate a reply message to client device 102 that includes the answer identified in the content item. In some embodiments, the reply message is in the same format as the incoming dialogue message transmitted from client device 102 to organization computing system 104. In some embodiments, the reply message is in a different format.

At step 212, organization computing system 104 may transmit the response message to client device 102.

Figure 3:
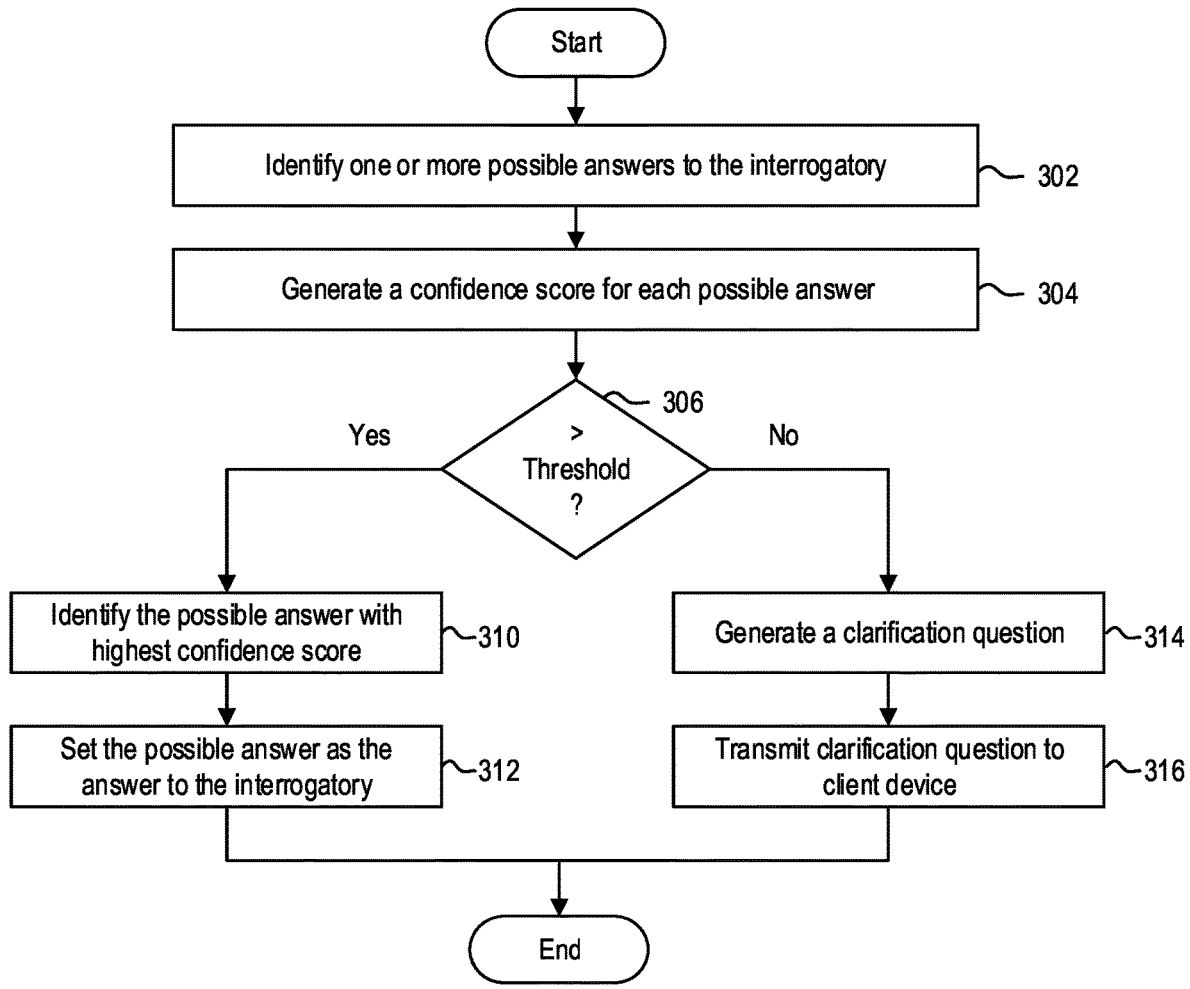
FIG. 3 is a flow diagram illustrating a method of establishing a communication session, according to example embodiments.

FIG. 3 is a flow diagram illustrating a method 300 of establishing an interactive chat message, according to example embodiments. Method 300 may begin at step 302.

At step 302, organization computing system 104 may identify one or more possible answers to an interrogatory received from client device 102. For example, upon scanning markup version of the content item, content item handler 124 may have identified two or more possible answers to the interrogatory.

At step 304, organization computing system 104 may generate a confidence score for each possible answer. For example, NLP device 122 may scan each section flagged by content item handler 124 to generate a confidence score associated with each possible answer. NLP device 122 may assign one or more points to one or more key words in each relevant section. The points may be assigned based on the relevance of the words.

In some embodiments, machine learning module 120 may train NLP device 122 using a supervised training model, in which a model is trained to recognize different questions. For example, a training set may be generated which includes a plurality of different questions, with each question manually tagged with what the intent is for each question. The training set may then be provided a input to NLP device 122 for training purposes. Once NLP device 122 is trained, NLP device 122 may be provided with a new, untagged question. NLP device 122 may then select which of the provided tags may fit with the new question, and rank each option by distributing points to each respective option. These points may represent the confidence score, and may be normalized such that they may add up to a certain value (e.g., 1).

At step 306, organization computing system 104 may compare each confidence score to a threshold amount. If, at step 306, organization computing system 104 determines that the confidence score for each answer does not exceed a threshold amount, then method 300 proceeds to step 314. At step 314, organization computing system 104 may generate a clarification question to be transmitted to client device 102. For example, chat interface 124 may generate a clarification question seeking clarity on an obscure or vague interrogatory posed by the user. Using a specific example, the user may request payment information associated with a vehicle the user owns. However, upon scanning content items in database 106, content item handler 124 may determine that the user owns two vehicles. Accordingly, content item handler 124 may instruct chat interface 118 to generate a clarification question regarding which the vehicle to which the user was referring.

At step 316, organization computing system 104 may transmit the clarification question to client device 102. In some embodiments, the clarification message is in the same format as the incoming dialogue message transmitted from client device 102 to organization computing system 104. In some embodiments, the clarification message is in a different format.

If, however, at step 308, organization computing system 104 determines that at least one possible answer exceeds the threshold amount, then method 300 proceeds to step 310. At step 310, organization computing system 104 may identify the possible answer with the highest confidence score. In other words, content item handler 124 may select, as the answer to the interrogatory, the answer that NLP device 122 trusts as the most accurate. At step 312, organization computing score 104 may set the possible answer as the answer to the interrogatory.

Figure 4:
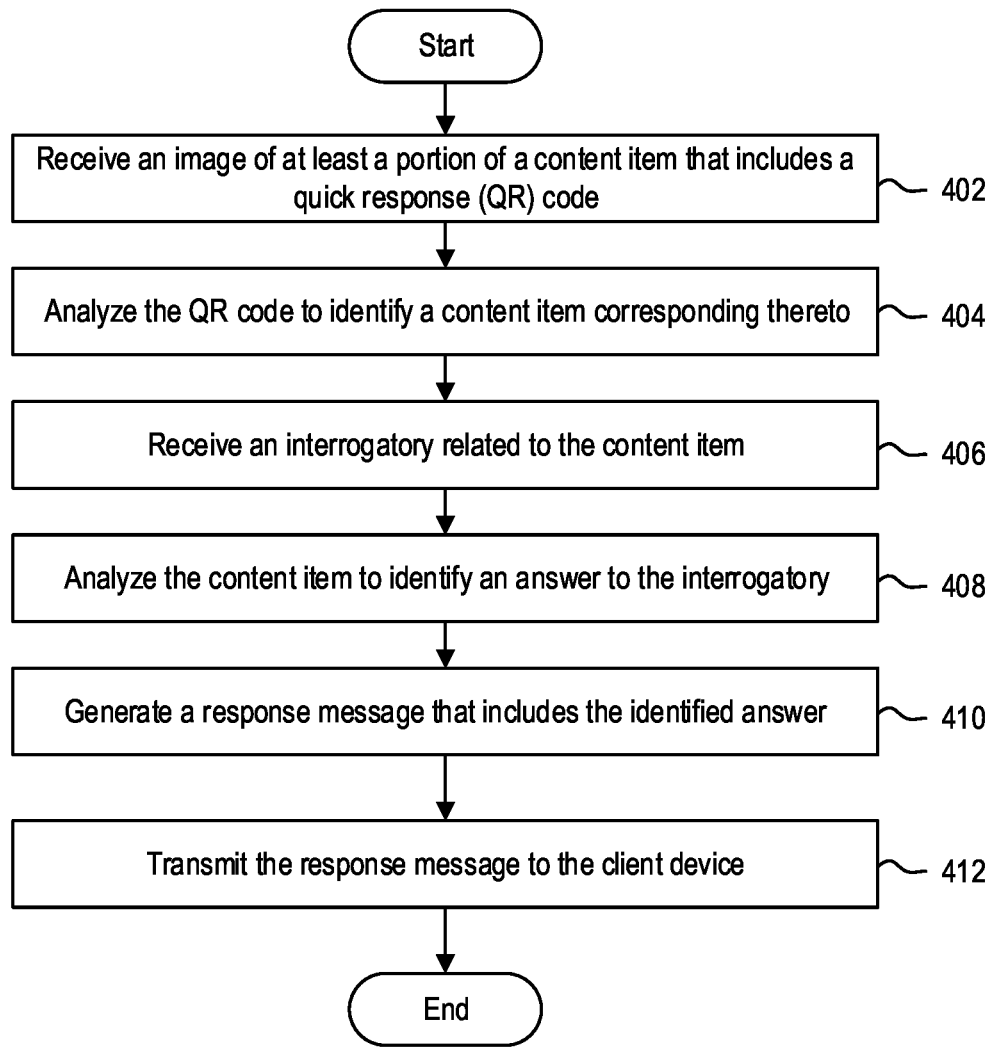
FIG. 4 is a flow diagram illustrating a method of establishing a communication session, according to example embodiments.

FIG. 4 is a flow diagram illustrating a method 400 of establishing a communication session, according to example embodiments.

In some embodiments, organization computing system 104 may be further configured to receive and process quick-response (QR) codes corresponding to a particular document. For example, rather than a user uploading a content item to organization computing system 104, a user may capture a photo of a content item's QR code. In some embodiments, client device 102 may include a QR reader (not shown) executing thereon. For example, the local QR reader may scan and identify a uniform resource locator (URL) corresponding thereto. The URL corresponding to the QR code may provide a location from which organization computing system 104 may download a markup version of the content item to which the QR code corresponds. In some embodiments, organization computing system 104 may obtain access to camera 110 associated with client device 102. Accordingly, rather than client device 102 executing a QR reader, organization computing system 104 may execute the QR reader. As such, the remote QR reader may scan and identify a URL corresponding thereto. Method 400 involves the use of a QR code. Method 400 may begin at step 402.

At step 402, organization computing system 104 may receive an image of at least a portion of a content item. For example, organization computing system 104 may receive an image that captures a quick-response (QR) code. The QR code may uniquely identify a content item corresponding thereto.

At step 404, organization computing system 104 may analyze the QR code to identify a content item corresponding thereto. For example, organization computing system 104 may execute a QR reader to scan the QR code. Scanning the QR code may reveal a URL corresponding to a location from which the content item may be downloaded. In some embodiments, the content item is already in markup form.

At step 406, organization computing system 104 may receive an interrogatory related to the content item. In some embodiments, organization computing system 104 may receive the interrogatory via chat interface 118. For example, chat interface 118 may receive an incoming dialogue message that includes one or more interrogatories from client device 102 via application 108. In another example, chat interface 118 may receive an incoming dialogue message that includes one or more interrogatories from client device 102 via messaging application 111.

At step 408, organization computing system 104 may analyze the markup version of the content item to identify an answer to the interrogatory. NLP device 122 may receive and process the incoming dialogue message from client device 102. For example, NLP device 122 may receive the interrogatory from client device 102 and determine the meaning of the interrogatory. NLP device 102 may notify content item handler 124 of the meaning of the interrogatory. NLP device 122 may output the meaning of the interrogatory contained therein in a format that content item handler 124 can process. Content item handler 124 may scan the markup version of the content item to identify an answer to the interrogatory. For example, content item handler 124 may identify one or more metatags relevant to the interrogatory and extract an answer to the interrogatory from the relevant section.

At step 410, organization computing system 104 may generate a response message that includes the identified answer. For example, chat interface 118 may be configured to generate a reply message to client device 102 that includes the answer identified in the content item. In some embodiments, the reply message is in the same format as the incoming dialogue message transmitted from client device 102 to organization computing system 104. In some embodiments, the reply message is in a different format.

At step 412, organization computing system 104 may transmit the response message to client device 102.

Figure 5:
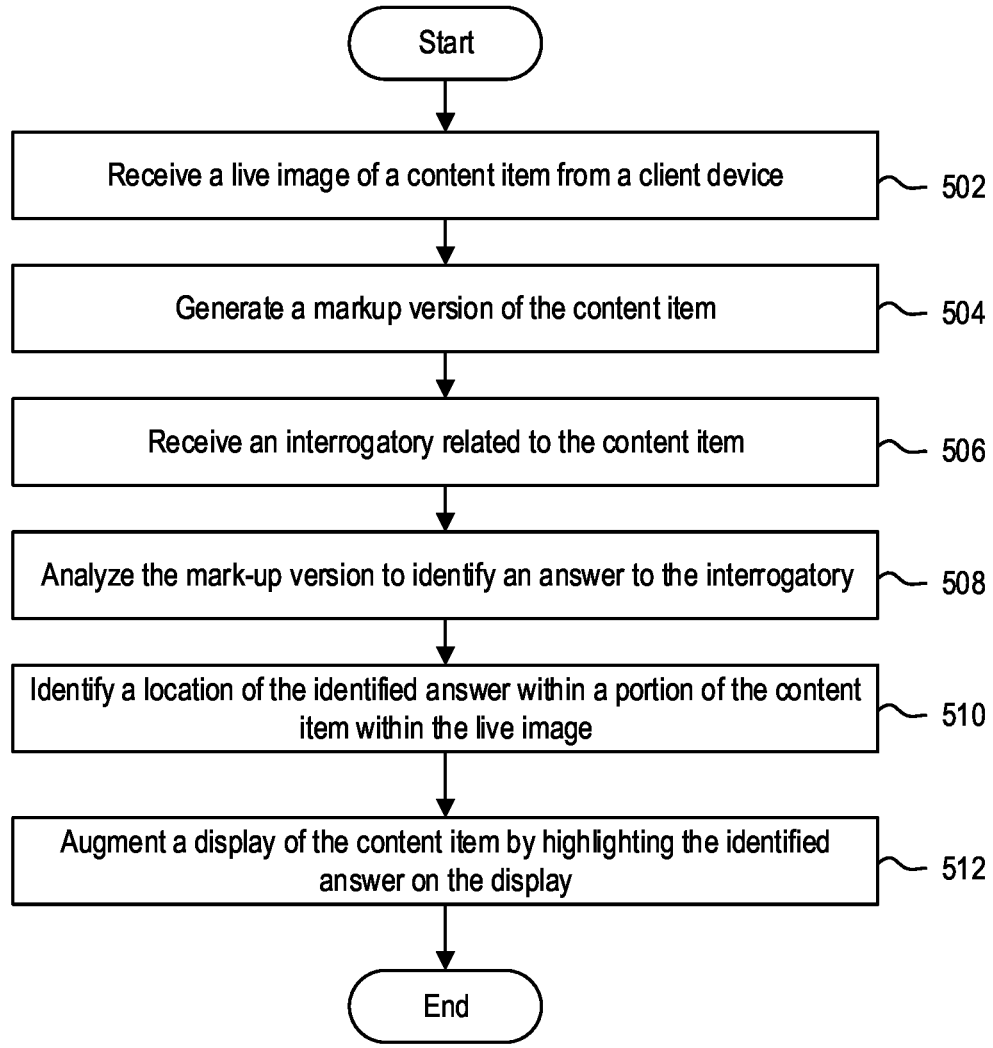
FIG. 5 is a flow diagram illustrating a method of establishing a communication session, according to example embodiments.

FIG. 5 is a flow diagram illustrating a method 500 of establishing a communication session, according to example embodiments. Method 500 may begin at step 502.

At step 502, organization computing system 104 may receive a live image of a content item from client device 102. For example, organization computing system 104 may receive a request, from client device 102, for organization computing system 104 to analyze a content item. Client device 102 may provide organization computing system 104 with access to camera 110. Client device 102 may capture a live image of the content item within the field of view of camera 110. Organization computing system 104 may receive a live stream of the content item.

At step 504, organization computing system 104 may generate a markup version of the content item. For example, dynamic content item module 116 may generate a markup version of the portion of the content item captured in the field of vision of camera 110. For example, machine learning module 120 and NLP device 122 may work in conjunction to generate a markup version of the portion of the content item captured in the field of vision of camera 110, in accordance with one or more operations discussed in conjunction with FIG. 2.

At step 506, organization computing system 104 may receive an interrogatory related to the content item. In some embodiments, organization computing system 104 may receive the interrogatory via chat interface 118. For example, chat interface 118 may receive an incoming dialogue message that includes one or more interrogatories from client device 102 via application 108. In another example, chat interface 118 may receive an incoming dialogue message that includes one or more interrogatories from client device 102 via messaging application 111. In some embodiments, organization computing system 104 may receive the interrogatory via microphone 117. For example, text-to-voice module 127 may receive an incoming dialogue message, via microphone 117 associated with client device 102, that includes one or more interrogatories. Text-to-voice module 127 may translate the audio message to text for further processing.

At step 508, organization computing system 104 may analyze the markup version of the content item to identify an answer to the interrogatory. NLP device 122 may receive and process the incoming dialogue message from client device 102. For example, NLP device 122 may receive the interrogatory from client device 102 and determine the meaning of the interrogatory. NLP device 102 may notify content item handler 124 of the meaning of the interrogatory. NLP device 122 may output the meaning of the interrogatory contained therein in a format that content item handler 124 can process. Content item handler 124 may scan the markup version of the content item to identify an answer to the interrogatory. For example, content item handler 124 may identify one or more metatags relevant to the interrogatory and extract an answer to the interrogatory from the relevant section.

At step 510, organization computing system 104 may identify a location of the answer within a portion of the content item within the live stream of the content item. For example, content item handler 124 may identify the location of the answer in the content item based on the portion of the content item within the field of view of camera 110.

At step 512, organization computing system 104 may augment a display of the content item by highlighting the identified answer on the display. For example, content item handler 124 may modify the user's display 112, such that it appears as if the content item is highlighted. For example, organization computing system 104 may provide meta-information to client device 102 about where in the content item the answer may be found. Application 108 (that has camera 110 access) may then look for the section of the content item based on the meta-information. For example, the meta-information may notify client device 102 that the answer may be found on page 2, or the bottom half of page 2, in which case that page (or a part of the page) my may be highlighted. In some embodiments, the meta-information may notify client device 102 of the relevant sentence that contains the answer. Accordingly, client device 102 may use OCR techniques to identify the sentence and highlight it.

Figure 6:
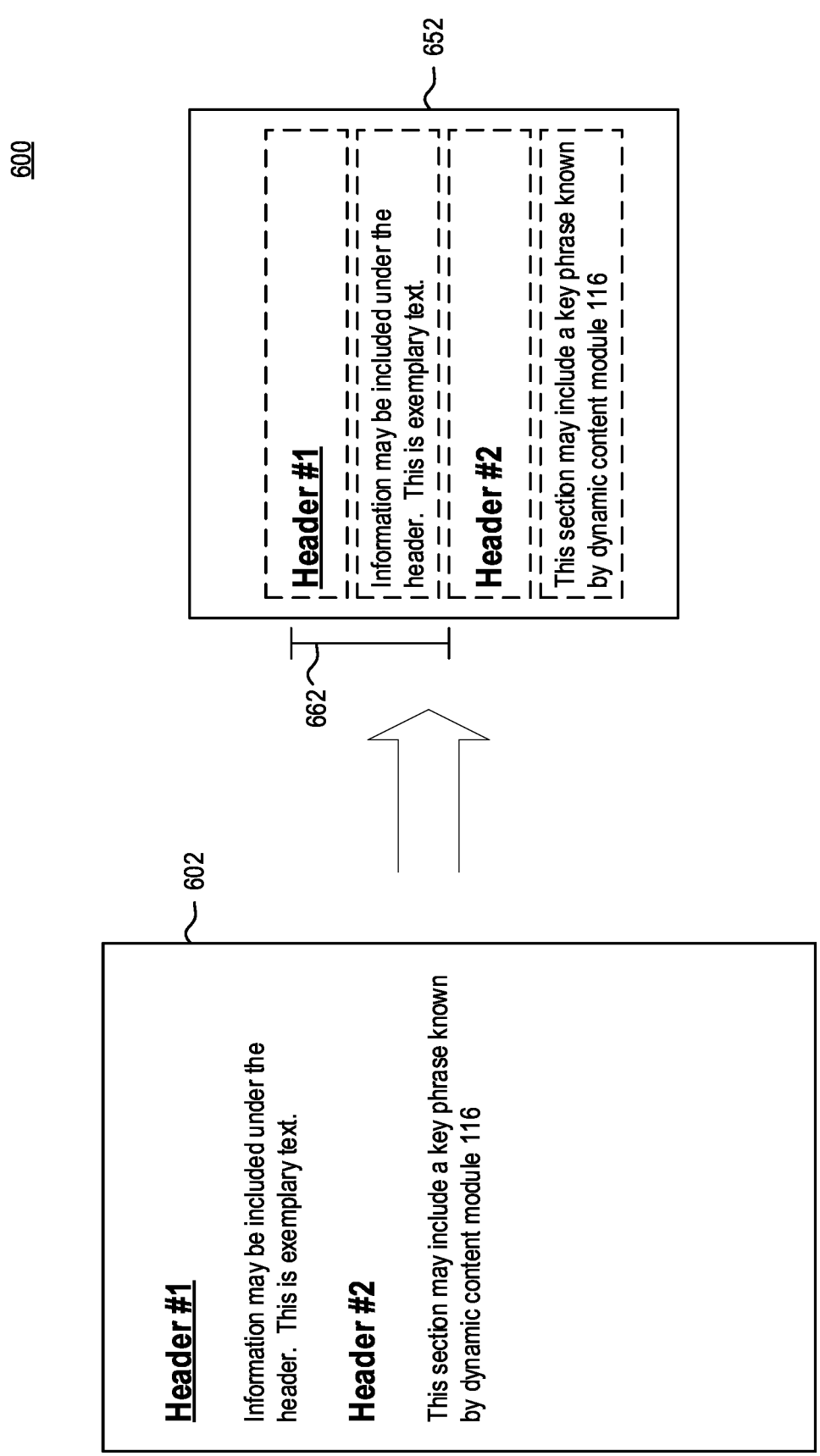
FIG. 6 is a block diagram illustrating an exemplary content item, according to example embodiments.

FIG. 6 is a block diagram 600 illustrating an exemplary conversion of a content item to a markup content item. As illustrated, block diagram 600 includes a content item 602 and a markup content item 652. Content item 602 may include Header #1 and accompanying text, and Header #2 and accompanying text. Upon receiving content item 602 from client device 102, dynamic content item module 116 may convert content item 602 to markup content item 652. For example, machine learning module 120 may utilize prediction model to inject metatags into content item 602, thereby creating markup content item 652. As illustrated, machine learning module 120 may identify headers in the content item (e.g., Header #1 and Header #2) by determining that the text associated with each header is larger than the text associated with accompanying text. Further, machine learning module 120 may determine that there are two groupings of information due to the distance between Header #1 and Header #2 (as illustrated by 662). The dashed lines shown are used to illustrate example metatags that may be injected into content item 602 by dynamic content item module 116.

Figure 7B:
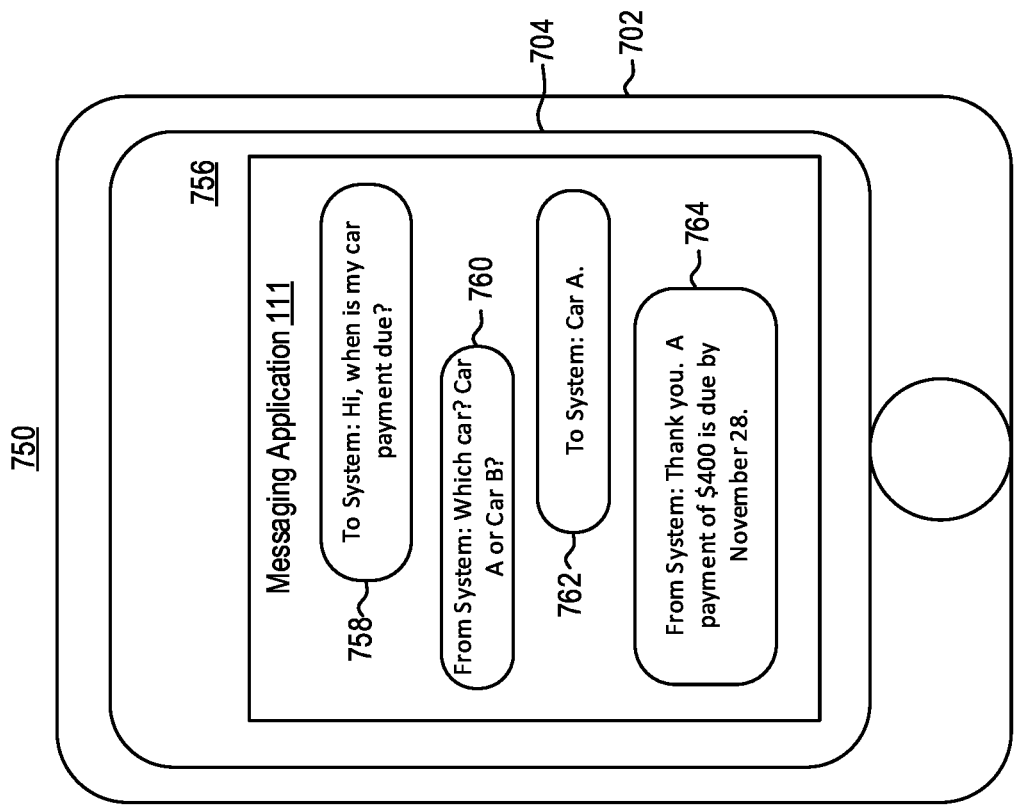
FIG. 7B is a block diagram illustrating an exemplary client device, according to example embodiments.
Figure 7A:
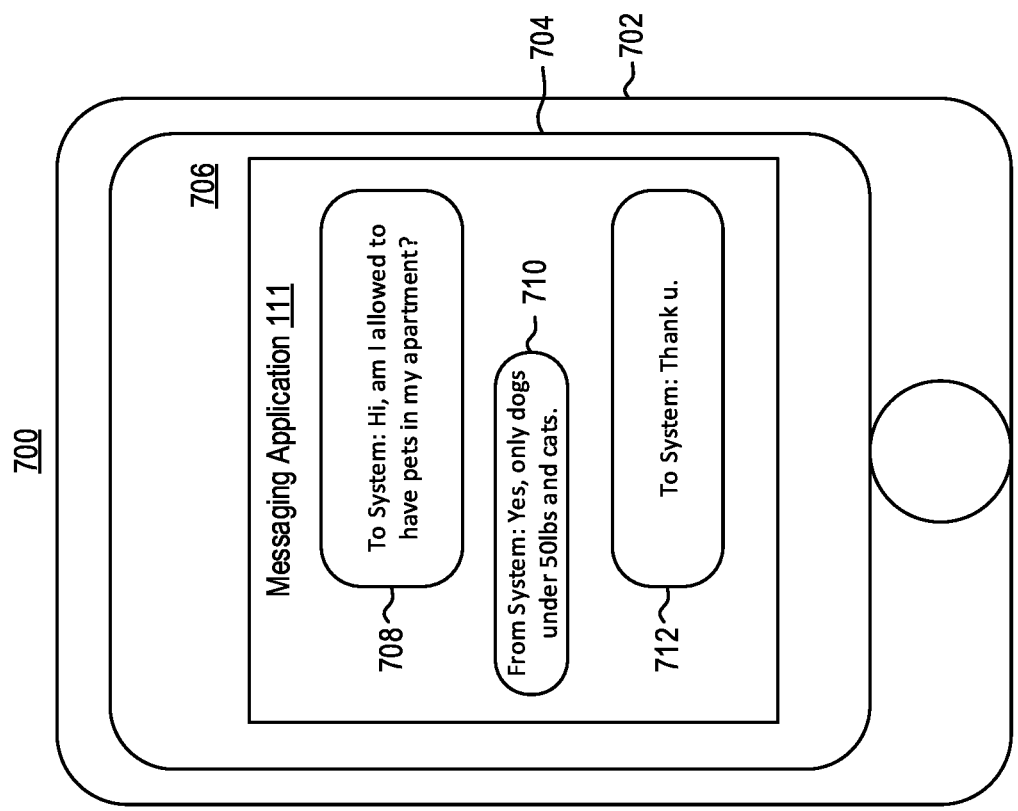
FIG. 7A is a block diagram illustrating an exemplary client device, according to example embodiments.

FIG. 7A is a block diagram 700 illustrating an exemplary client device 702, according to example embodiments. Client device 702 may be representative of client device 102. Client device 702 may include a screen 704. As illustrated, screen 704 may display a graphical user interface (GUI) 706. GUI 706 may represent a communication session established between organization computing system 104 and client device 702. For example, GUI 706 may illustrate a communication session in messaging application 111.

GUI 706 may include one or more messages 708-712. Message 708 may be a message from client device 702 to organization computing system 104 (i.e., "system"). Message 708 may include an interrogatory: Hi, am I allowed to have pets in my apartment? Upon receiving the interrogatory, dynamic content item module 116 may parse the interrogatory using NLP device 124 to determine a meaning of the interrogatory. After determining the meaning of the interrogatory, content item handler 124 may scan a markup version of a content item stored in database 106 (e.g., the user's apartment lease) to identify an answer to the user's question. In some embodiments, such process may be performed to recognize text embedded in images (e.g., promotional materials that have text on top of images).

Message 710 may include an answer to the user's interrogatory. For example, as illustrated, message 710 may recite: Yes, only dogs under 501*bs* and cats. Message 712 may represent a confirmation from client device 702 to organization computing system 104. For example, message 712 recites: Thank u.

FIG. 7B is a block diagram 750 illustrating an exemplary client device 702, according to example embodiments. Client device 702 may be representative of client device 102. Client device 702 may include a screen 704. As illustrated, screen 704 may display a graphical user interface (GUI) 756. GUI 756 may represent a communication session established between organization computing system 104 and client device 702. For example, GUI 756 may illustrate a communication session in messaging application 111.

GUI 756 may include one or more messages 758-764. Message 758 may be a message from client device 702 to organization computing system 104 (i.e., "system"). Message 708 may be an interrogatory: Hi, when is my car payment due? Upon receiving the interrogatory, dynamic content item module 116 may parse the interrogatory using NLP device 124 to determine a meaning of the interrogatory. After determining the meaning of the interrogatory, content item handler 124 may scan a markup version of a content item stored in database 106 (e.g., the user's car loan agreement) to identify an answer to the user's question. In some embodiments, content item handler 124 may identify two possible answers to the interrogatory, each of which does not exceed a threshold level of confidence. For example, the user may have two vehicles. Accordingly, organization computing system 104 may generate a clarification question: Which car? Car A or Car B.

Upon receiving the clarification question from organization computing system 104, client device 102 may transmit a response: Car A. Upon receiving Car A, dynamic content item module 116 may determine that one answer of the two possible answers is the correct answer. Accordingly, organization computing system 104 may reply with the answer: Thank you. A payment of $400 is due by November 28.

Figure 8B:
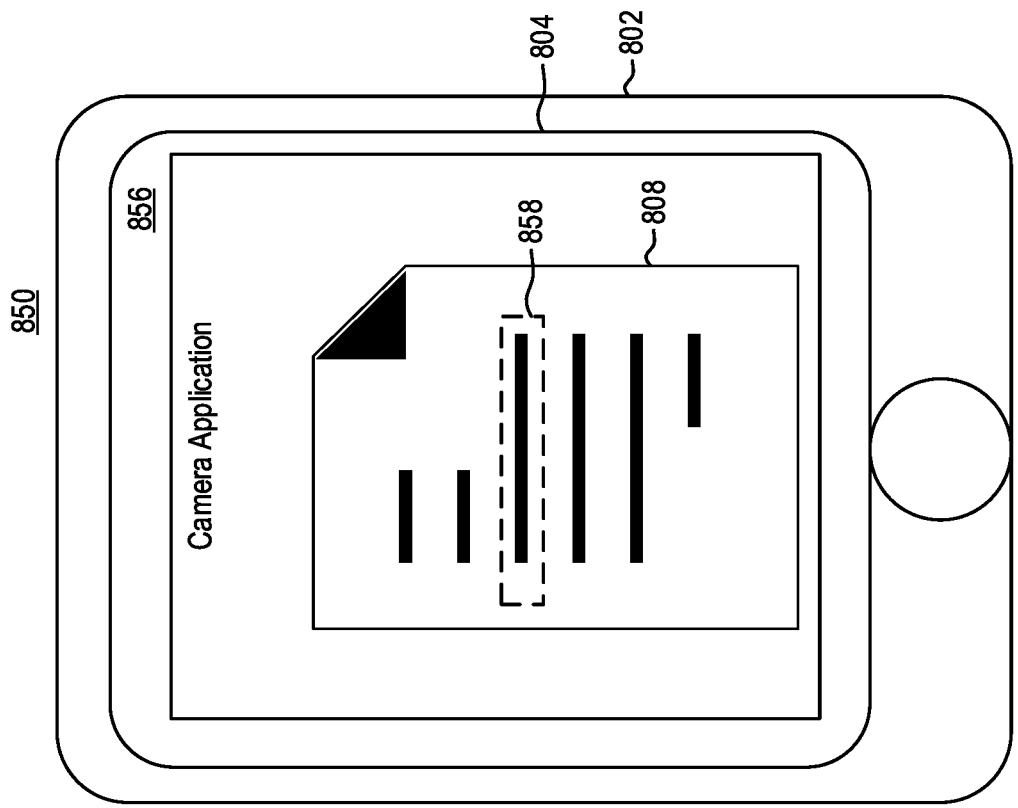
FIG. 8B is a block diagram illustrating an exemplary client device, according to example embodiments.
Figure 8A:
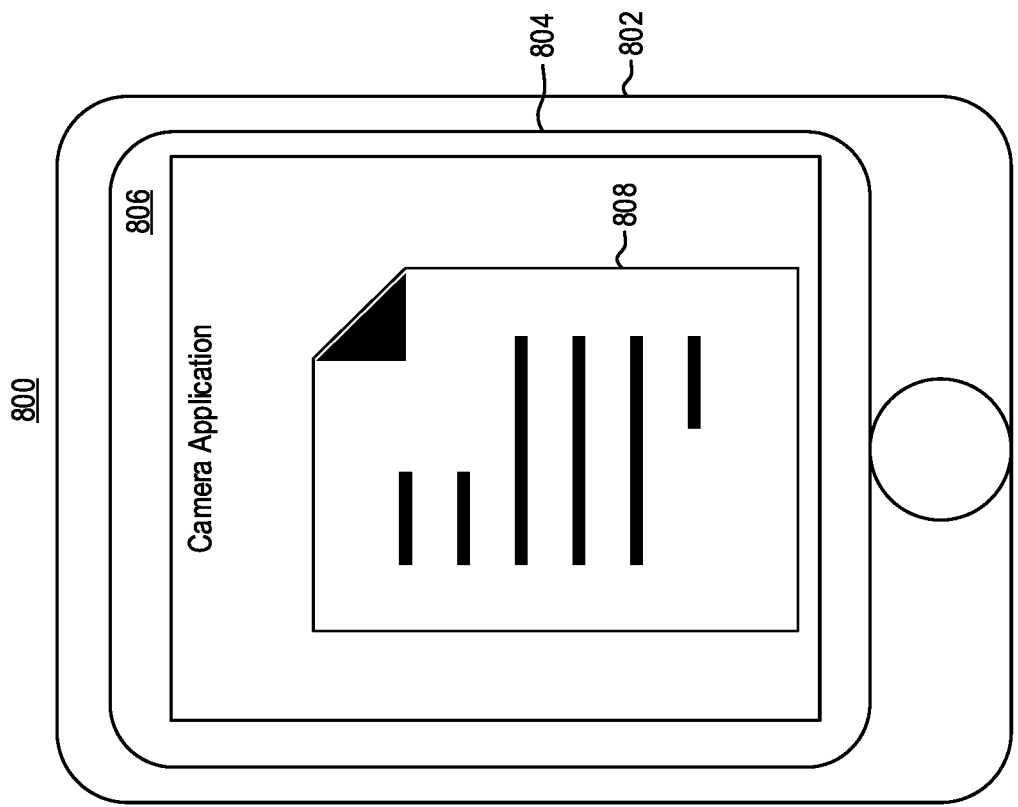
FIG. 8A is a block diagram illustrating an exemplary client device, according to example embodiments.

FIG. 8A is a block diagram 800 illustrating an exemplary client device 802, according to example embodiments. Client device 802 may be representative of client device 102. Client device 802 may include a screen 804. As illustrated, screen 804 may display a graphical user interface (GUI) 806. GUI 806 may represent a camera application executing on client device 802. Client device 802 may have granted organization computing system 104 access to camera application. Such access may be granted after client device 102 posed an interrogatory to organization computing system 104.

As illustrated, camera of client device 802 may have a live stream of document 808. Upon receiving the live stream of document 808, dynamic content item module 116 may analyze document 808 to create a markup version thereof. Dynamic content item module 116 may further identify an answer to the interrogatory posed by client device 102.

FIG. 8B is a block diagram 850 illustrating an exemplary client device 802, according to example embodiments. Client device 802 may be representative of client device 102. Client device 802 may include a screen 804. As illustrated, screen 804 may display a graphical user interface (GUI) 856. GUI 856 may represent a camera application executing on client device 802. Client device 802 may have granted organization computing system 104 access to camera application.

As illustrated, organization computing system 104 may identify the location of the identified answer on the content item, as displayed in the live stream. Dynamic content item module 116 may augment the display of client device 802 to highlight a portion 858 of content item 808 that contains an answer to the user's interrogatory.

Figure 9:
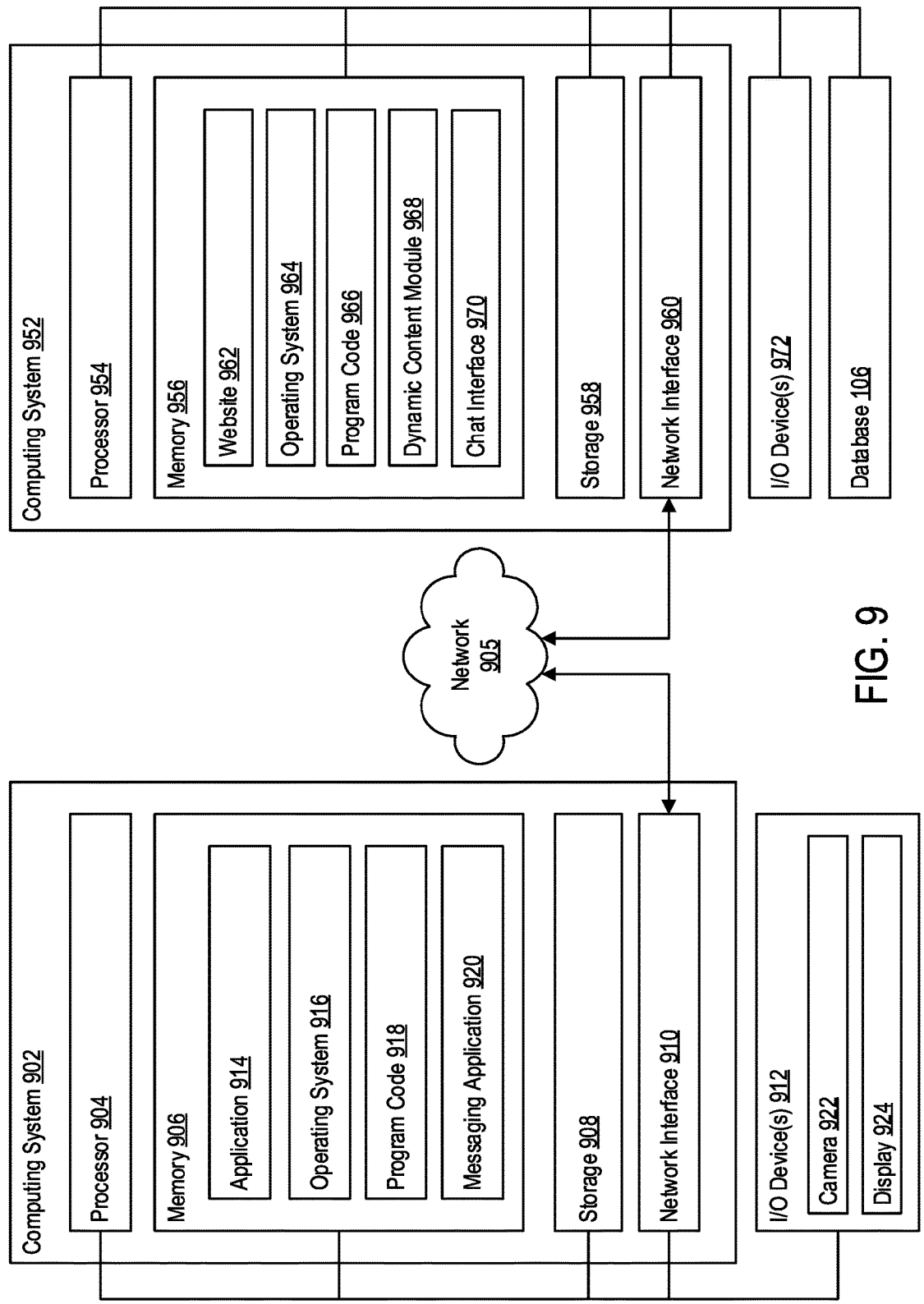
FIG. 9 is a block diagram illustrating a computing environment, according to example embodiments.

FIG. 9 is a block diagram illustrating an exemplary computing environment 900, according to some embodiments. Computing environment 900 includes computing system 902 and computing system 952. Computing system 902 may be representative of client device 102. Computing system 952 may be representative of organization computing system 104.

Computing system 902 may include a processor 904, a memory 906, a storage 908, and a network interface 910. In some embodiments, computing system 902 may be coupled to one or more I/O device(s) 912 (e.g., keyboard, mouse, etc.).

As illustrated, I/O devices 912 may include camera 922 and display 924. In some embodiments, camera 922 may be integrated with computing system 902. For example, camera 922 may be built into computing system 902 (e.g., front-facing and/or rear-facing camera of a mobile device). In some embodiments, camera 922 may be separate from computing system 902. For example, camera 922 may be a digital camera that can upload images to computing system 902. Generally, camera 922 may be an input device configured to capture one or more images for upload to computing system 952. For example, camera 922 may be configured to capture one or more images of a content item for upload to computing system 952.

In some embodiments, display 924 may be integrated with computing system 902. For example, display 924 may be a screen of a mobile device or tablet. In some embodiments, display 924 may be separate from computing system 902. For example, display 924 may be a monitor coupled to computing system 902. Generally, display 924 may be an output device associated with computing system 902. Display 924 may be configured to display one or more graphical user interfaces (GUIs) that are received and/or rendered by computing system 902.

Processor 904 may retrieve and execute program code 920 (i.e., programming instructions) stored in memory 906, as well as stores and retrieves application data. Processor 904 may be included to be representative of a single processor, multiple processors, a single processor having multiple processing cores, and the like. Network interface 910 may be any type of network communications allowing computing system 902 to communicate externally via computing network 905. For example, network interface 910 is configured to enable external communication with computing system 952.

Storage 908 may be, for example, a disk storage device. Although shown as a single unit, storage 908 may be a combination of fixed and/or removable storage devices, such as fixed disk drives, removable memory cards, optical storage, network attached storage (NAS), storage area network (SAN), and the like.

Memory 906 may include application 914, operating system 916, program code 918, and messaging application 920. Program code 918 may be accessed by processor 904 for processing (i.e., executing program instructions). Program code 918 may include, for example, executable instructions for communicating with computing system 952 to display one or more pages of website 964. Application 914 may enable a user of computing system 902 to access a functionality of computing system 952. For example, application 914 may access content managed by computing system 952, such as website 962. The content that is displayed to a user of computing system 902 may be transmitted from computing system 952 to computing system 902, and subsequently processed by application 914 for display through a graphical user interface (GUI) of computing system 902.

Messaging application 920 may be representative of a web browser that allows access to a website or a stand-alone application. In some embodiments, computing system 902 may be configured to execute messaging application 920 to access an email account managed by a third party web server. In some embodiments, computing system 902 may be configured to execute messaging application 920 to transmit one or more text messages (e.g., SMS messages, iMessages, etc.) to one or more remote computing devices.

Computing system 952 may include a processor 954, a memory 956, a storage 958, and a network interface 960. In some embodiments, computing system 952 may be coupled to one or more I/O device(s) 962. In some embodiments, computing system 952 may be in communication with database 106.

Processor 954 may retrieve and execute program code 966 (i.e., programming instructions) stored in memory 956, as well as stores and retrieves application data. Processor 954 is included to be representative of a single processor, multiple processors, a single processor having multiple processing cores, and the like. Network interface 960 may be any type of network communications enabling computing system 952 to communicate externally via computing network 905. For example, network interface 960 allows computing system 952 to communicate with computer system 902.

Storage 958 may be, for example, a disk storage device. Although shown as a single unit, storage 958 may be a combination of fixed and/or removable storage devices, such as fixed disk drives, removable memory cards, optical storage, network attached storage (NAS), storage area network (SAN), and the like.

Memory 956 may include website 962, operating system 964, program code 966, dynamic content item module 968, and chat interface 970. Program code 966 may be accessed by processor 954 for processing (i.e., executing program instructions). Program code 966 may include, for example, executable instructions configured to perform steps discussed above in conjunction with FIGS. 2-5. As an example, processor 954 may access program code 968 to perform operations related to converting a content item to a markup content item, and responding to one or more interrogatories posed by computing system 902. Website 962 may be accessed by computing system 902. For example, website 962 may include content accessed by computing system 902 via a web browser or application.

Dynamic content item module 968 may be configured to convert a content item uploaded by computing system 902 to a mark-up version of the content item. By converting the content item uploaded by the computing system 902 to a mark-up version, dynamic content item module 968 may facilitate interrogatories directed to the content of the convent item. In other words, dynamic content item module 968 may convert a content item to a mark-up version such that a user may establish a communication session with computing system 952 directed to the content of the content item. For example, a user, via application 914 or messaging application 920, may transmit a question to computing system 952 directed to the content of content items managed by computing system 952.

Chat interface 970 may be configured to receive one or more messages from computing system 902. For example, chat interface 970 may be configured to establish a persistent chat session between computing system 902 and computing system 952. Additionally, chat interface 970 may engage in dialogue with a user of computing system 902, such that chat interface 970 may respond to any follow-up questions the user may have.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method of establishing a communication session, comprising:
   receiving, by a computing system from a camera of a client device, a live stream of a textual document comprising text-based content;
   receiving, by the computing system, an interrogatory related to the text-based content in the textual document;
   analyzing, by the computing system, the textual document to identify an answer to the interrogatory in the textual document; and
   augmenting the textual document illustrated on a display associated with the client device, while the textual document remains within a line-of-vision of the camera by:
      identifying a location of the identified answer within a portion of the textual document within the line-of-vision of the camera, and
      highlighting the identified answer on the display by augmenting the display corresponding to the location of the identified answer, wherein the highlighting comprises:
         generating a meta information, wherein the meta information indicates the location of the identified answer within the portion of the textual document, and
         overlaying the meta information over the portion of the textual document within the line-of-vision of the camera.

2. The method of claim 1, wherein analyzing, by the computing system, the textual document to identify the answer to the interrogatory in the textual document comprises:
   analyzing one or more metatags injected into the textual document to identify the answer in the textual document.

3. The method of claim 1, wherein analyzing, by the computing system, the textual document to identify the answer to the interrogatory, comprises:
   identifying one or more possible answers to the interrogatory;
   generating a confidence score for each possible answer of the one or more possible answers;
   identifying a possible answer that is associated with a highest confidence score; and
   setting the possible answer associated with the highest confidence score as the answer to the interrogatory.

4. The method of claim 1, wherein analyzing, by the computing system, the textual document to identify the answer to the interrogatory, comprises:
   identifying one or more possible answers to the interrogatory;
   generating a confidence score for each possible answer of the one or more possible answers;
   determining that the confidence score for each possible answer is below a threshold confidence score;
   based on the determining, generating a clarification question seeking clarification of the identified interrogatory; and
   transmitting the clarification question to the client device.

5. The method of claim 4, further comprising:
   receiving, from the client device, a clarification answer from the client device; and
   parsing the clarification answer to identify a revised interrogatory contained therein.

6. The method of claim 5, further comprising:
   analyzing the textual document to identify a revised answer to the revised interrogatory;
   generating a second confidence score for the revised answer;
   determining that the second confidence score for the revised answer is at least greater than the threshold confidence score; and
   setting the revised answer as the answer to the interrogatory.

7. The method of claim 1, wherein receiving, by the computing system, the interrogatory related to the text-based content in the textual document comprises:
   receiving a voice message comprising the interrogatory; and
   converting the voice message to text using natural language processing techniques.

8. A non-transitory computer readable medium comprising one or more sequences of instructions which, when executed by a processor, causes a computing system to perform operations comprising:
   receiving, by the computing system from a camera of a client device, a live stream of a textual document comprising text-based content;

receiving, by the computing system, an interrogatory related to the text-based content in the textual document;

analyzing, by the computing system, the textual document to identify an answer to the interrogatory in the textual document; and augmenting the textual document illustrated on a display associated with the client device, while the textual document remains within a line-of-vision of the camera by:

identifying a location of the identified answer within a portion of the textual document within the line-of-vision of the camera, and highlighting the identified answer on the display by augmenting the display corresponding to the location of the identified answer, wherein the highlighting comprises:

generating a meta information, wherein the meta information indicates the location of the identified answer within the portion of the textual document, and overlaying the meta information over the portion of the textual document within the line-of-vision of the camera.

9. The non-transitory computer readable medium of claim 8, wherein analyzing, by the computing system, the textual document to identify the answer to the interrogatory in the textual document comprises:

analyzing one or more metatags injected into the textual document to identify the answer in the textual document.

10. The non-transitory computer readable medium of claim 8, wherein analyzing, by the computing system, the textual document to identify the answer to the interrogatory, comprises:

identifying one or more possible answers to the interrogatory;

generating a confidence score for each possible answer of the one or more possible answers;

identifying a possible answer that is associated with a highest confidence score; and setting the possible answer associated with the highest confidence score as the answer to the interrogatory.

11. The non-transitory computer readable medium of claim 8, wherein analyzing, by the computing system, the textual document to identify the answer to the interrogatory, comprises:

identifying one or more possible answers to the interrogatory;

generating a second confidence score for each possible answer of the one or more possible answers;

determining that the second confidence score for each possible answer is below a threshold confidence score;

based on the determining, generating a clarification question seeking clarification of the identified interrogatory;

transmitting the clarification question to the client device;

receiving, from the client device, a clarification answer from the client device; and parsing the clarification answer to identify a revised interrogatory contained therein.

12. The non-transitory computer readable medium of claim 11, further comprising:

analyzing the textual document to identify a revised answer to the revised interrogatory;

generating a confidence score for the revised answer;

determining that the confidence score for the revised answer is at least greater than the threshold confidence score; and setting the revised answer as the answer to the interrogatory.

13. The non-transitory computer readable medium of claim 8, wherein receiving, by the computing system, the interrogatory related to the text-based content in the textual document comprises:

receiving a voice message comprising the interrogatory; and converting the voice message to text using natural language processing techniques.

14. A system comprising:

one or more processors; and a memory having programming instructions stored thereon, which, when executed by the one or more processors, causes the system to perform operations comprising:

receiving, by a computing system from a camera of a client device, a live stream of a textual document comprising text-based content;

receiving, by the computing system, an interrogatory related to the text-based content in the textual document;

analyzing, by the computing system, the textual document to identify an answer to the interrogatory in the textual document; and augmenting the textual document illustrated on a display associated with the client device, while the textual document remains within a line-of-vision of the camera by:

identifying a location of the identified answer within a portion of the textual document within the line-of-vision of the camera, and highlighting the identified answer on the display by augmenting the display corresponding to the location of the identified answer, wherein the highlighting comprises:

generating a meta information, wherein the meta information indicates the location of the identified answer within the portion of the textual document, and overlaying the meta information over the portion of the textual document within the line-of-vision of the camera.

15. The system of claim 14, wherein analyzing the textual document to identify the answer to the interrogatory in the textual document comprises:

analyzing one or more metatags injected into the textual document to identify the answer in the textual document.

16. The system of claim 14, wherein analyzing the textual document to identify the answer to the interrogatory, comprises:

identifying one or more possible answers to the interrogatory;

generating a confidence score for each possible answer of the one or more possible answers;

identifying a possible answer that is associated with a highest confidence score; and setting the possible answer associated with the highest confidence score as the answer to the interrogatory.

17. The system of claim 14, wherein analyzing the textual document to identify the answer to the interrogatory, comprises:

identifying one or more possible answers to the interrogatory;
generating a confidence score for each possible answer of the one or more possible answers;
determining that the confidence score for each possible answer is below a threshold confidence score;
based on the determining, generating a clarification question seeking clarification of the identified interrogatory; and
transmitting the clarification question to the client device.

18. The system of claim 17, wherein the operations further comprise:
receiving, from the client device, a clarification answer from the client device; and
parsing the clarification answer to identify a revised interrogatory contained therein.

19. The system of claim 18, further comprising:
analyzing the textual document to identify a revised answer to the revised interrogatory;
generating a second confidence score for the revised answer;
determining that the second confidence score for the revised answer is at least greater than the threshold confidence score; and
setting the revised answer as the answer to the interrogatory.

* * * * *